(12) United States Patent
Wind, III et al.

(10) Patent No.: US 10,628,873 B2
(45) Date of Patent: Apr. 21, 2020

(54) SYSTEMS AND METHODS FOR DYNAMIC CALCULATION AND UPDATES OF VALUES

(71) Applicant: Walmart Apollo, LLC, Bentonville, AR (US)

(72) Inventors: Anthony G. Wind, III, Gravette, AR (US); Brandon Thorne, Raleigh, NC (US); William Bissic, Bentonville, AR (US); Aaron Guist, Fayetteville, AZ (US); Peter Ojezua, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 313 days.

(21) Appl. No.: 15/500,415

(22) PCT Filed: Jul. 23, 2015

(86) PCT No.: PCT/US2015/041788
§ 371 (c)(1),
(2) Date: Jan. 30, 2017

(87) PCT Pub. No.: WO2016/018721
PCT Pub. Date: Feb. 4, 2016

(65) Prior Publication Data
US 2017/0213278 A1  Jul. 27, 2017

Related U.S. Application Data

(60) Provisional application No. 62/030,878, filed on Jul. 30, 2014.

(51) Int. Cl.
*G06Q 30/00* (2012.01)
*G06Q 30/06* (2012.01)
(Continued)

(52) U.S. Cl.
CPC ........ *G06Q 30/0635* (2013.01); *G06Q 20/14* (2013.01); *G06Q 20/20* (2013.01);
(Continued)

(58) Field of Classification Search
USPC ...................................................... 705/26.1
See application file for complete search history.

(56) References Cited

U.S. PATENT DOCUMENTS

| 7,013,292 | B1 | 3/2006 | Hsu et al. |
| 8,036,953 | B2 | 10/2011 | Hsu et al. |

(Continued)

OTHER PUBLICATIONS

International Search Report and Written Opinion in related International Patent Application PCT/US2015/041788 dated Oct. 23, 2015.

(Continued)

*Primary Examiner* — Mila Airapetian
(74) *Attorney, Agent, or Firm* — McCartner & English, LLP; David R. Burns

(57) ABSTRACT

A system for roll-up payments in a retail environment is provided. The system includes a processor coupled to a memory storing a wish list associated with a wish list user identifying an item, customer registration information identifying a registered customer associated with the wish list, and an amount of available funds associated with the wish list, an interface component configured to receive sales transaction information and provide updated sales transaction information, and a roll-up payment component. The roll-up payment component is configured to match identification information associated with the registered customer with the received sales transaction information, increase the transaction amount and the amount of available funds, determine whether the amount of available funds has transgressed a threshold amount equal to a purchase price of an (Continued)

item on the wish list, and generate a notification for the wish list user.

20 Claims, 5 Drawing Sheets

(51) Int. Cl.
    *G06Q 20/20*     (2012.01)
    *G06Q 30/02*     (2012.01)
    *G06Q 20/14*     (2012.01)
    *G06Q 20/40*     (2012.01)
    *G06Q 20/22*     (2012.01)

(52) U.S. Cl.
    CPC ........... *G06Q 20/29* (2013.01); *G06Q 20/405* (2013.01); *G06Q 30/0215* (2013.01); *G06Q 30/0633* (2013.01)

(56) References Cited

U.S. PATENT DOCUMENTS

| | | |
|---|---|---|
| 8,423,466 B2 | 4/2013 | Lanc |
| 8,676,669 B1 | 3/2014 | Chittoor et al. |
| 8,751,376 B1 | 6/2014 | Wilkes |
| 2003/0233283 A1 | 12/2003 | Shah |
| 2010/0121723 A1 | 5/2010 | Miller et al. |
| 2010/0161449 A1 | 6/2010 | Hsu et al. |
| 2010/0161450 A1 | 6/2010 | Hsu et al. |
| 2010/0293082 A1 | 11/2010 | Benham et al. |
| 2011/0016014 A1 | 1/2011 | Tonnison et al. |
| 2011/0191181 A1 | 8/2011 | Blackhurst et al. |
| 2012/0226587 A1* | 9/2012 | de Lara ............... G06Q 30/06 705/27.1 |
| 2013/0006805 A1 | 1/2013 | Ulli |
| 2013/0110670 A1 | 5/2013 | Webber et al. |
| 2013/0282476 A1 | 10/2013 | Peterson et al. |
| 2013/0332348 A1 | 12/2013 | Lee et al. |
| 2016/0342992 A1* | 11/2016 | Lee .................... G06Q 30/06 |

OTHER PUBLICATIONS

International Preliminary Report on Patentability issued in related international patent application No. PCT/US2015/04178 dated Feb. 9, 2017.

\* cited by examiner

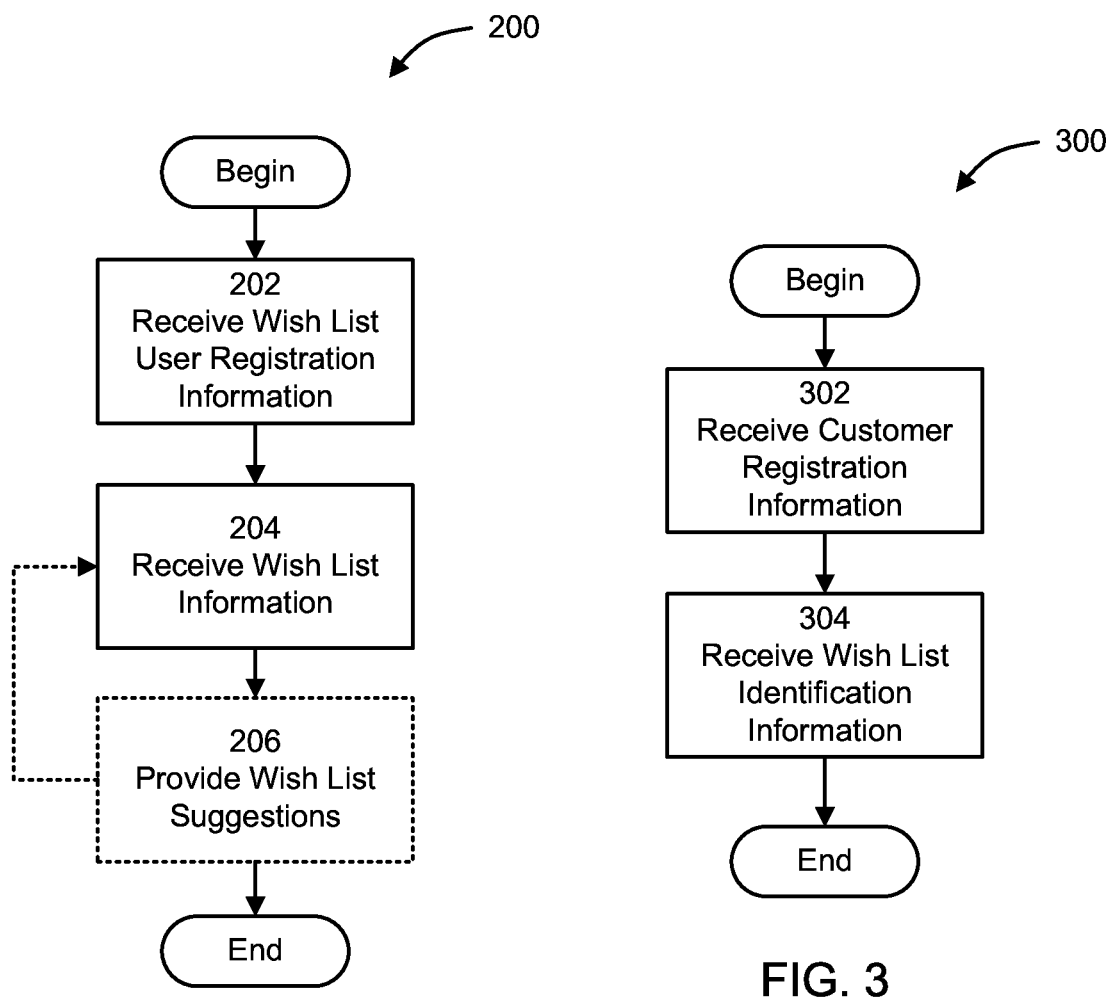

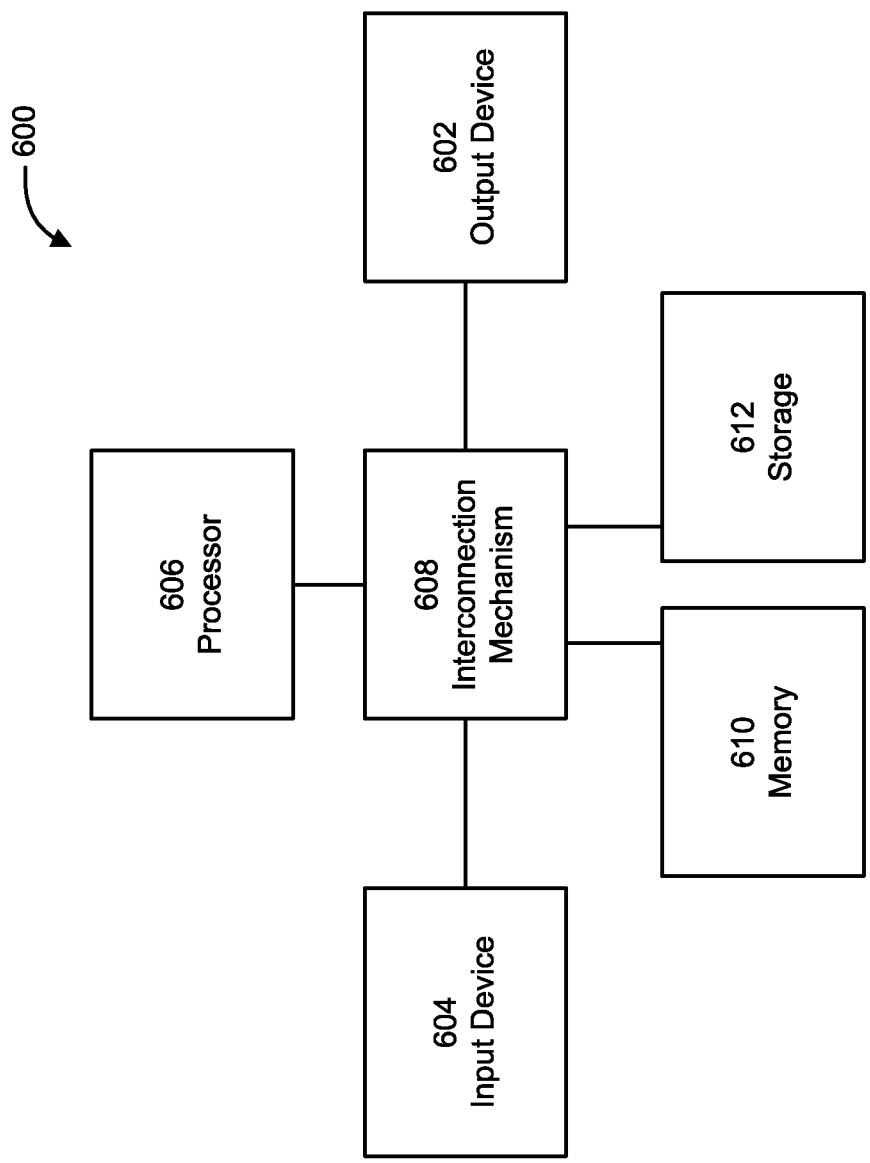

SYSTEMS AND METHODS FOR DYNAMIC CALCULATION AND UPDATES OF VALUES

RELATED APPLICATIONS

This application is a 35 U.S.C. § 371 National Stage filing of International Application PCT/US2015/041788, filed on Jul. 23, 2015, which claims priority to U.S. Provisional Application No. 62/030,878 filed on Jul. 30, 2014. The contents of each application are hereby incorporated by reference in their entirety.

BACKGROUND OF THE DISCLOSURE

Discussion of Related Art

People generally have desired products and/or services to purchase that are, for example, outside their current financial capacity. Saving money out of a steady income to purchase a desired item may be difficult due to previous financial obligations. Saving money for an expensive durable good (e.g., an appliance) may be particularly challenging given the scale of the up-front purchase price.

SUMMARY

Saving for the purchase of a product and/or service may be a challenging endeavor for many individuals due to various financial obligations and the nature of their income. These individuals, however, engage in various sales transactions for goods and/or services on a frequent basis. Each of these sales transactions generally involves transaction amounts that include fractions of a given base currency (e.g., two United States dollars and fifty-seven cents). Accordingly, systems and methods for roll-up payments are provided that round-up the transaction amount (e.g., round two United States dollars and fifty-seven cents to three United States dollars) for participating users to save towards one or more items on a wish list.

According to one aspect, a system for roll-up payments in a retail environment is provided. The system comprises at least one processor coupled to a memory storing a wish list associated with at least one wish list user uniquely identifying at least one item, customer registration information uniquely identifying at least one registered customer associated with the wish list, and an amount of available funds associated with the wish list, an interface component, executed by the at least one processor, configured to receive sales transaction information including a transaction amount and provide updated sales transaction information including an increased transaction amount, and a roll-up payment component executed by the at least one processor. The roll-up payment component is configured to match identification information associated with the at least one registered customer with the received sales transaction information, increase the transaction amount responsive to matching identification information associated with the at least one registered customer with the received sales transaction information, increase the amount of available funds associated with the wish list responsive to increasing the transaction amount, determine whether the amount of available funds has transgressed a threshold amount equal to a purchase price of at least one item on the wish list, and generate a notification for the at least one wish list user responsive to the determination that the amount of available funds transgressed the threshold.

In one embodiment, the roll-up payment component is further configured to generate a purchase request for the at least one item responsive to determining that the amount of available funds transgressed the threshold and decrease the amount of funds available by an amount equal to the purchase price of the at least one item responsive to generating the purchase request. In this embodiment, the roll-up payment component may be further configured to request purchase confirmation from the at least one wish list user responsive to determining that the amount of available funds transgressed the threshold.

In one embodiment, the interface component is further configured to receive a purchase confirmation from the at least one wish list user and wherein the roll-up payment component is further configured to generate the purchase request responsive to receiving the purchase confirmation. In one embodiment, the at least one item includes a product and wherein the roll-up payment component is further configured to generate the purchase request at least in part by generating a shipment request to ship the product to the at least one wish list user.

In one embodiment, the wish list further includes a priority associated with each item of the at least one item and wherein the threshold amount of available funds is equal to a purchase price of at least one item with a high priority. In one embodiment, the roll-up payment component is further configured to request confirmation from the at least one registered customer responsive to matching identification information associated with the at least one customer with the received sales transaction information. In one embodiment, the interface component is further configured to receive a confirmation from the at least one customer and wherein the roll-up payment component is further configured to increase the transaction amount responsive to receiving the confirmation from the at least one customer.

In one embodiment, the at least one wish list user and the at least one registered customer include at least one common user. In one embodiment, the interface is configured to receive sales transaction information from at least one of a point-of-sale system and an e-commerce system.

According to one aspect, a computer implemented method for roll-up payments in a retail environment is provided. The method comprises storing a wish list associated with at least one wish list user uniquely identifying at least one item, customer registration information uniquely identifying at least one registered customer associated with the wish list, and an amount of available funds associated with the wish list, receiving sales transaction information including a transaction amount, matching identification information associated with the at least one registered customer with the received sales transaction information, increasing the transaction amount responsive to matching identification information associated with the at least one registered customer with the received sales transaction information, increasing the amount of available funds associated with the wish list responsive to increasing the transaction amount, determining whether the amount of available funds has transgressed a threshold amount equal to a purchase price of at least one item on the wish list, generating a notification for the at least one wish list user responsive to the determination that the amount of available funds transgressed the threshold, and providing updated sales transaction information including the increased transaction amount.

In one embodiment, the method further comprises generating a purchase request for the at least one item responsive to determining that the amount of available funds transgressed the threshold and decreasing the amount of funds available by an amount equal to the purchase price of the at least one item responsive to generating the purchase request.

In one embodiment, the method further comprises requesting purchase confirmation from the at least one wish list user responsive to determining that the amount of available funds transgressed the threshold. In one embodiment, the method further comprises receiving a purchase confirmation from the at least one wish list user and wherein the roll-up payment component and wherein the act of generating the purchase request includes generating the purchase request responsive to receiving the purchase confirmation. In one embodiment, the at least one item includes at least one product and the act of generating the purchase request includes generating a shipment request to ship the at least one product to the at least one wish list user.

In one embodiment, the act of storing a wish list associated with at least one wish list user includes storing a priority associated with each item of the at least one item and the act of determining whether the amount of available funds has transgressed the threshold amount includes determining whether the amount of available funds has transgressed a threshold amount equal to a purchase price of at least one item with a high priority.

In one embodiment, the method further comprises requesting confirmation from the at least one registered customer responsive to matching identification information associated with the at least one customer with the received sales transaction information. In one embodiment, the method further comprises receiving a confirmation from the at least one customer and wherein the act of increasing the transaction amount includes increasing the transaction amount responsive to receiving the confirmation from the at least one customer.

In one embodiment, the act of receiving sales transaction information includes the act of receiving sales transaction information from one of a point-of-sale system and an online payment system.

According to one aspect, a non-transitory computer readable medium having stored thereon sequences of instruction for roll-up payments in a retail environment is provided. The instructions including instructions that instruct at least one processor to store a wish list associated with at least one wish list user uniquely identifying at least one item, customer registration information uniquely identifying at least one registered customer associated with the wish list, and an amount of available funds associated with the wish list, receive sales transaction information including a transaction amount, match identification information associated with the at least one registered customer with the received sales transaction information, increase the transaction amount responsive to matching identification information associated the at least one registered customer with the received sales transaction information, increase the amount of available funds associated with the wish list responsive to increasing the transaction amount, determine whether the amount of available funds has transgressed a threshold amount equal to a purchase price of at least one item on the wish list, generate a notification for the at least one wish list user responsive to the determination that the amount of available funds transgressed the threshold, and provide updated sales transaction information including the increased transaction amount.

BRIEF DESCRIPTION OF DRAWINGS

The accompanying drawings are not intended to be drawn to scale. In the drawings, each identical or nearly identical component that is illustrated in various FIGS. is represented by a like numeral. For purposes of clarity, not every component may be labeled in every drawing. In the drawings:

FIG. 2 is a flow chart illustrating a process for registering wish list users in accordance with at least one embodiment described herein;

FIG. 3 is a flow chart illustrating a process for registering customers in accordance with at least one embodiment described herein;

FIG. 6 is a block diagram illustrating computing components forming a computer system in accordance with at least one embodiment described herein.

DETAILED DESCRIPTION

Figure 1:
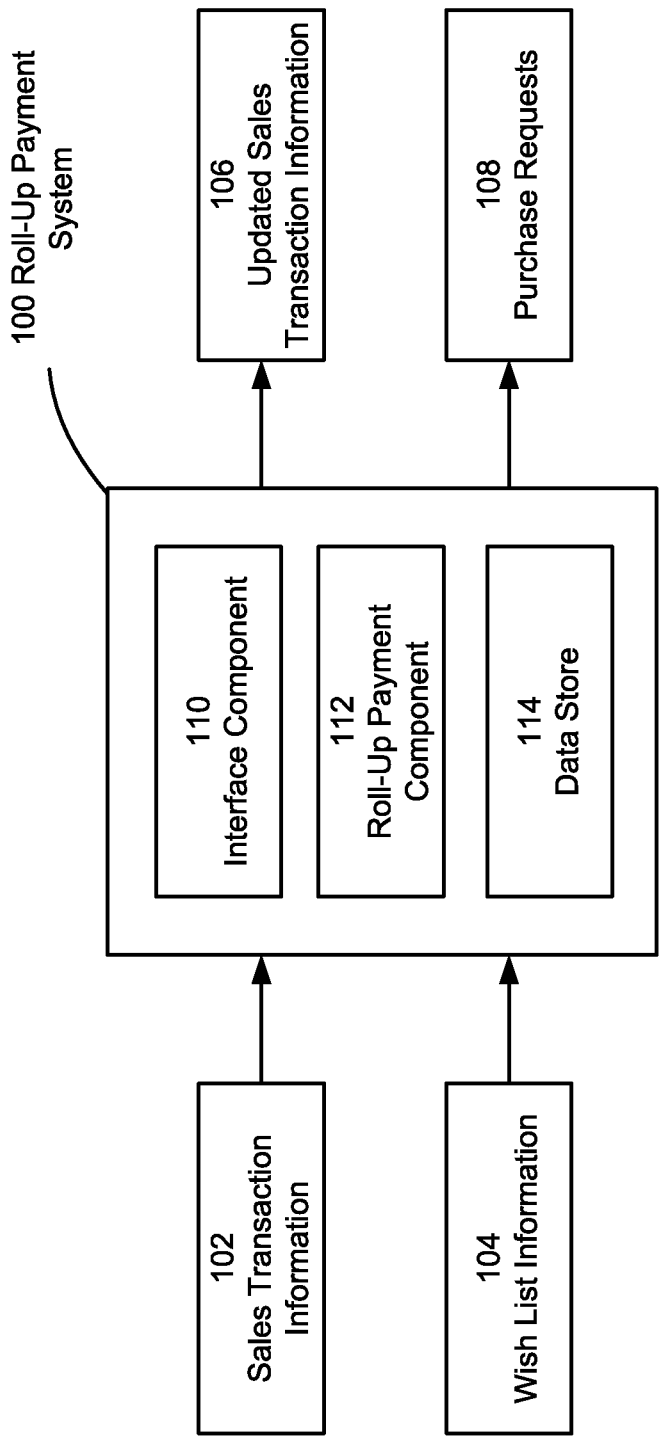
FIG. 1 is a block diagram illustrating a roll-up payment system in accordance with at least one embodiment described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

The exemplary embodiments include a system and method that provide technical improvements directed towards a system for a customer/user to automatically save toward and purchase specific items on a wish list. Furthermore, the exemplary embodiments provide a novel and effective way for a customer to save toward and purchase specific items off a customer/user's wish list using the amount of money saved. The system and method provide a technical improvement by reducing the number of queries to the database by providing the functionality of automatically purchasing an item off the customer's/user's wish list once enough funds are saved up by the customer/user. The functionality of automatically purchasing reduces multiple searches for the desired item by the customer/user performed by the system and in turn reduces the burden on the server and database and technically improving the system.

The phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As described above, individuals engage in sales transactions including fractional amounts of a base currency on a frequent basis. Accordingly, aspects of the current disclosure relate to roll-up payment systems and methods that round-up transaction amounts for registered customers and apply the roll-up payment to one or more items on a wish list.

Example Roll-Up Payment System

FIG. 1 illustrates a roll-up payment system 100 constructed to round-up transaction amounts for participating users and apply the additional payment (i.e., the roll-up payment) towards one or more items on a wish list. The roll-up payment system 100 receives sales transaction information 102 and wish list information 104 and outputs updated sales transaction information 106 and purchase requests 108. The roll-up payment system includes an interface component 110, a roll-up payment processing component 112, and a data store 114.

In one embodiment, the interface component 110 receives sales transaction information 102 and provides updated sales transaction information 106. In this embodiment, the interface component 110 may be configured to receive the sales transaction information 102 from and provide the updated sales transaction information 104 to a point-of-sale (POS) system at, for example, a retail store and/or an e-commerce system. The e-commerce system may include for example a web-application that permits customers to purchase various products and/or services over the internet. The received sales transaction information 102 may include, for example, a transaction amount and customer identification information. The updated sales transaction information 106 may include, for example, an increased transaction amount consistent with specified roll-up payment parameters associated with the customer. It is appreciated that the interface component 110 may include one or more system interface that can be configured to receive particular settings with respect to the administration of roll-up payments.

In one embodiment, the interface component 110 receives wish list information 104 and provides purchase requests 108. In this embodiment, the wish list information 104 includes one or more items that are available to be purchased. The items on the wish list may include a product and/or a service. The purchase requests 108 provided by the interface component 110 include information indicating the wish list item that is being purchased and information identifying the wish list user associated with the wish list. For example, the purchase requests 108 may include a home address of the wish list user to ship a purchased product. In addition, the wish list information may further include a priority associated with each item on the list. The roll-up payments may be applied to items with a higher priority first as further described below with reference to the roll-up payment component 112.

In one embodiment, the roll-up payment component 112 is configured to generate updated sales transaction information 106 based on the received sales transaction information 102. In this embodiment, the roll-up payment component 112 is configured to match the customer identification information in the received sales transaction information 102 with identification information associated with a registered customer (e.g., stored in data store 114). If the received customer identification information matches the identification information associated with a registered customer, the roll-up payment component 112 may increase the transaction amount to generate updated sales transaction information 106. The roll-up payment may be applied to the wish list associated with the registered customer by increasing an amount of available funds associated with the wish list by an amount equal to the roll-up payment.

In one embodiment, the roll-up payment component 112 is configured to generate purchase requests 108 based on wish list information 104 and sales transaction information 102. As discussed above, the roll-up payment component 112 may be configured to increase an amount of available funds associated with a particular wish list. The roll-up payment component 112 may be further configured to generate a purchase request 108 for a particular item responsive to the amount of available funds associated with the wish list transgressing a threshold equal to the purchase price of a wish list item. The purchase request 108 includes an indication of the item purchased from with wish list and information identifying the wish list user associated with the wish list. For example, the purchase request may indicate that a wish list user has purchased a new home appliance and include a home address of the wish list user to ship the new home appliance. The roll-up payment component 112 may further decrease the amount of available funds associated with the wish list by an amount equal to the purchase price of the item.

In some embodiments, the data store 114 includes a registered customer database. The registered customer database includes information associated with the registered customers to uniquely identify the registered customers based on the received sales transaction information in addition to any association with various wish lists. For example, the registered customer database may store a credit card number associated with a registered customer and an association with a particular wish list. In this example, the roll-up payment component 112 may match a credit card number received in the sales transaction information 102 with the credit card number stored in data store 114 and apply the roll-up payment to the wish list associated with the registered customer. It is appreciated that the registered customer database may further include customer preference information. For example, customer preference information may indicate the scale of the roll-up payment (e.g., round up to the nearest tenth of a United States dollar).

In some embodiments, the data store 114 includes a wish list database. The wish list database includes information defining one or more wish lists and information associated with one or more wish list users. Each of the wish lists may include one or more items (e.g., a product and/or a service), an amount of available funds, and optionally a priority associated with each item. As discussed above, the roll-up payment component 112 may apply the roll-up payment to high priority items before applying the roll-up payment to low priority items. Each of the wish lists may have one or more associated wish list users who are the targeted recipients of the purchased wish list items.

In some embodiments, the components described above with regard to FIG. 1 are software components that are executable by, for example, a computer system. In other embodiments, some or all of the components may be implemented in hardware or a combination of hardware and software. Other example roll-up payment processes are described below with reference to FIGS. 2-5 that may be executed by a computer system such as the computer system described below with reference to FIG. 6.

Example Roll-Up Payment Processes

As described above with reference to FIG. 1, several embodiments perform processes that round-up transaction amounts to assist registered customers to put money towards, for example, one or more items on a wish list. In some embodiments, these roll-up payment processes are executed by a microprocessor-based computer system, such as computer system 600 described below with reference to FIG. 6. These roll-up payment processes may also be executed by or integrated with an e-commerce site.

FIG. 2 is a flow chart illustrating a wish list user registration process 200 performed by a computer system in accordance with at least one embodiment described herein. The wish list user registration process 200 registers wish list users with the system. The wish list user registration process 200 begins in act 202.

In act 202, the system receives wish list user registration information. The wish list user registration information may include contact information associated with the wish list user (e.g., name, phone number, and home address). In act 204, the system receives wish list information identifying one or more items to include on the wish list associated with the wish list user. The wish list items may include one or more products and/or services and optionally a priority associated with each product and/or service. For example, the wish list information may include information identifying a first product with a low priority and a second product with a high priority.

In optional act 206, the system provides one or more suggested items to add to the wish list to the wish list user. The system may suggest items by matching one or more characteristics associated with the items already included in the wish list and available items. For example, the wish list may include a television and the system may provide a suggested addition of a television coaxial cable. In addition, the system may suggest items based on a purchase history associated with the wish list user in cases where the wish list user is also a registered customer associated with the wish list. For example, the registered customer (and wish list user) may purchase grill accessories and the system may provide a suggested addition of a new grill to the wish list. The system may return to act 204 to receive additional wish list information from the wish list user.

FIG. 3 is a flow chart illustrating a customer registration process 300. The customer registration process 300 registers the customer with the system. The customer registration process 300 begins in act 302.

In act 302, the system receives customer registration information. The customer registration information may include information that uniquely identifies the customer. For example, the customer registration information may include an email address associated with the customer. In this example, the system may employ the email address associated with the registered customer to match received sales transaction information with the registered customer. In addition, the system may receive preference information associated with the registered customer including, for example, an indication of specific types of transactions that should undergo roll-up payments and the scale of the roll-up payment in each transaction.

In act 304, the system receives wish list identification information. The wish list identification information includes information that uniquely identifies the particular wish list which the roll-up payments are applied. Multiple wish lists may be identified and the roll-up payment may be apportioned between the wish lists. For example, the system may receive information identifying two wish lists in addition to information regarding the apportionment of the roll-up payment to each list (e.g., 40% to the first wish list and 60% to the second wish list).

It is appreciated that a wish list user may also be a registered customer and vice-versa. In addition, more than one registered customer may be associated with any given wish list. For example, two parents may each be registered customers applying their roll-up payments towards a wish list associated with their child, a wish list user.

Figure 4:
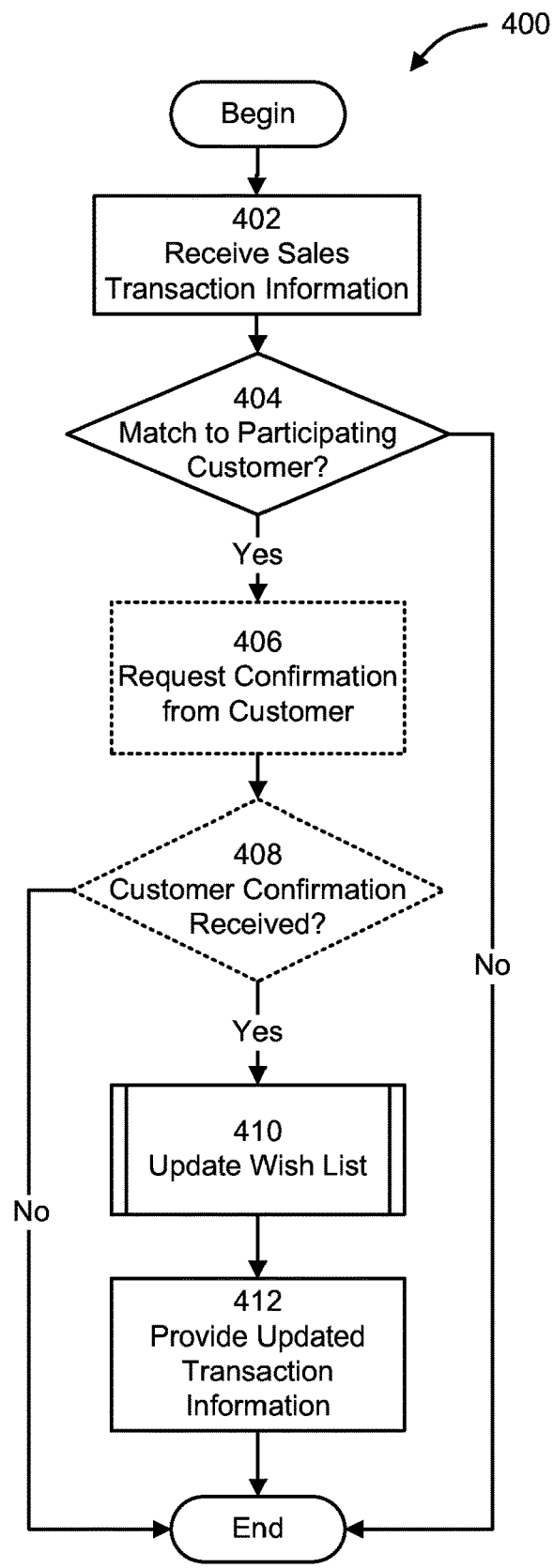
FIG. 4 is a flow chart illustrating a process for performing roll-up payments in accordance with at least one embodiment described herein.

FIG. 4 is a flow chart illustrating a roll-up payment process 400. The roll-up payment process 400 generates roll-up payments for registered customers and applies the roll-up payment to one or more wish lists. The roll-up payment process 400 begins in act 402.

In act 402, the system receives sales transaction information. The received sales transaction information may include a transaction amount and information identifying the customer participating in the transaction. In act 404, the system determines whether there is a match between the customer identifying information received in the sales transaction information and a registered customer. If the system matches the received customer identification information with a registered customer, the system proceeds to optional act 406 and requests confirmation from the registered customer. The request for confirmation may include, for example, an indication of the associated wish list and the amount of the roll-up payment. Otherwise, the roll-up payment process 400 ends and the sales transaction proceeds without a roll-up payment.

In optional act 408, the system determines whether confirmation was received from the registered customer for the roll-up payment. If confirmation is received, the system proceeds to sub-routine 410 and updates the wish list. An example update wish list sub-routine is described further below with regard to wish list update process 500 in FIG. 5. Otherwise, the roll-up payment process 400 ends and the sales transaction proceeds without a roll-up payment. In act 412, the system provides updated sales transaction information. The updated sales transaction information may include an increased transaction amount.

Figure 5:
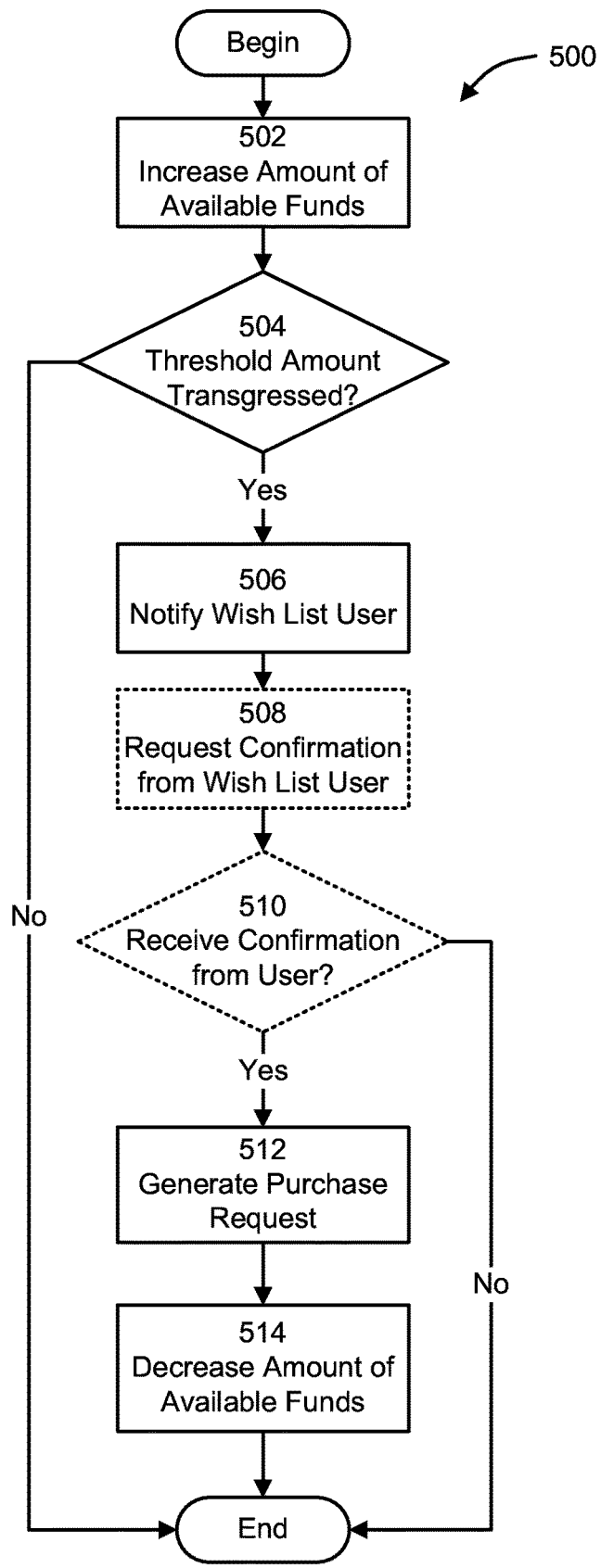
FIG. 5 is a flow chart illustrating a process for updating a wish list in accordance with at least one embodiment described herein.

FIG. 5 is a flow chart illustrating a wish list update process 500. The wish list update process updates information associated with the wish list responsive to processing a roll-up payment. The wish list update process 500 begins in act 502.

In act 502, the system increases the amount of available funds associated with the wish list. The increased amount of available funds may be equal to the roll-up payment amount. The system may also apportion the roll-up payment between multiple wish lists based on preference information associated with the registered customer (e.g., preference information as provided within a user interface or control).

In act 504, the system determines whether the amount of available funds associated with the wish list transgressed a threshold equal to the purchase price of at least one item on the wish list. In embodiments where the wish list includes a priority associated with each item on the wish list, the system may determine whether the amount of available funds transgressed a threshold equal to the purchase price of the highest priority item on the wish list. If the amount of available funds has transgressed the threshold, the system proceeds to act 506 and notifies the wish list users associated with the wish list. Otherwise, the wish list update process 500 ends.

In optional act 508, the system requests confirmation from the wish list user to purchase an item on the wish list with the available funds. The confirmation may include an indication of the item that is available to be purchased with the current amount of available funds.

In optional act 510, the system determines whether confirmation was received from the wish list user. If confirmation was received from the wish list user, the system proceeds to act 512 and generates a purchase request for the item from the wish list. The purchase request may include an indication of the purchased item and a target recipient (e.g., a wish list user). Otherwise, the wish list update process 500 ends. In act 514, the system decreases the amount of available funds associated with the wish list by an amount equal to the purchase price of the item.

It is appreciated that the acts included in the processes 200, 300, 400, and 500 may be performed by, or using, one or more computer systems or programmable devices specially configured as discussed herein. Some acts are optional and, as such, may be omitted in accord with one or more embodiments. Additionally, the order of the acts can be altered, or other acts can be added, without departing from the scope of the embodiments described herein. Furthermore, as described above, in at least one embodiment, the acts are performed on particular, specially configured machines, namely a roll-up payment system configured according to the examples and embodiments disclosed herein.

Furthermore, various aspects and functions described herein in accord with the present disclosure may be implemented as hardware, software, firmware or any combination thereof. Aspects in accord with the present disclosure may be implemented within methods, acts, systems, system elements and components using a variety of hardware, software or firmware configurations. Furthermore, aspects in accord with the present disclosure may be implemented as specially-programmed hardware and/or software.

Example Computer System

FIG. 6 illustrates an example block diagram of computing components forming a system 600 which may be configured to implement one or more aspects disclosed herein. For example, the system 600 may be configured to perform one or more roll-up payment processes as described above with reference to FIGS. 2-5.

The system 600 may include for example a general-purpose computing platform such as those based on Intel PENTIUM-type processor, Motorola PowerPC, Sun Ultra-SPARC, Texas Instruments-DSP, Hewlett-Packard PA-RISC processors, or any other type of processor. System 600 may include specially-programmed, special-purpose hardware, for example, an application-specific integrated circuit (ASIC). Various aspects of the present disclosure may be implemented as specialized software executing on the system 600 such as that shown in FIG. 6.

The system 600 may include a processor/ASIC 606 connected to one or more memory devices 610, such as a disk drive, memory, flash memory or other device for storing data. Memory 610 may be used for storing programs and data during operation of the system 600. Components of the computer system 600 may be coupled by an interconnection mechanism 608, which may include one or more buses (e.g., between components that are integrated within a same machine) and/or a network (e.g., between components that reside on separate machines). The interconnection mechanism 608 enables communications (e.g., data, instructions) to be exchanged between components of the system 600.

The system 600 also includes one or more input devices 604, which may include for example, a keyboard or a touch screen. An input device may be used for example to configure the measurement system or to provide input parameters. The system 600 includes one or more output devices 602, which may include for example a display. In addition, the computer system 600 may contain one or more interfaces (not shown) that may connect the computer system 600 to a communication network, in addition or as an alternative to the interconnection mechanism 608.

The system 600 may include a storage system 612, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 610 that allows for faster access to the information by the processor/ASIC than does the medium. This memory 610 may be a volatile, random access memory such as a dynamic random access memory (DRAM) or static memory (SRAM). It may be located in storage system 612 or in memory system 610. The processor 606 may manipulate the data within the integrated circuit memory 610 and then copy the data to the storage 612 after processing is completed. A variety of mechanisms are known for managing data movement between storage 612 and the integrated circuit memory element 610, and the disclosure is not limited thereto. The disclosure is not limited to a particular memory system 610 or a storage system 612.

The system 600 may include a general-purpose computer platform that is programmable using a high-level computer programming language. The system 600 may be also implemented using specially programmed, special purpose hardware, e.g. an ASIC. The system 600 may include a processor 606, which may be a commercially available processor such as the well-known Pentium class processor available from the Intel Corporation. Many other processors are available. The processor 606 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system comprising:
   at least one processor coupled to a memory storing:
   a list of items associated with a set of registered users,
   user registration information uniquely identifying the set of registered users associated with the list, and
   an amount of available funds associated with the list;
   a first component, executed by the at least one processor, configured to:
   receive information including a first data value from one or more devices associated with the set of registered users, wherein the first data value is a transaction amount,
   dynamically calculate an increased first data value, wherein the increased first data value is an increased transaction amount; and
   a second component, executed by the at least one processor, configured to:
   match identification information associated with the set of registered users with the received information;
   increase the first data value in response to matching identification information associated with the set of registered users with the received information;
   increase the amount of available funds associated with the list by the increased first data value;
   determine whether the amount of available funds has transgressed a threshold amount equal to a specified value of at least one item on the list;
   generate a notification to the set of registered users responsive to the determination that the amount of available funds transgressed the threshold; and
   generate a request for the at least one item responsive to determining that the amount of available funds transgressed the threshold.

2. The system of claim 1, wherein the second component is further configured to:
   decrease the amount of funds available by an amount equal to the specified value of the at least one item responsive to generating the request.

3. The system of claim 2, wherein the second component is further configured to request confirmation from the set of registered users responsive to determining that the amount of available funds transgressed the threshold.

4. The system of claim 3, wherein the first component is further configured to receive a confirmation from the set of registered users and wherein the component is further configured to generate the request responsive to receiving the confirmation.

5. The system of claim 2, wherein the at least one item includes a product and wherein the component is further configured to generate the request at least in part by generating a shipment request to ship the product to the set of registered users.

6. The system of claim 1, wherein a wish list further includes a priority associated with each item of the at least one item and wherein the threshold amount of available funds is equal to a specified value of at least one item with a high priority.

7. The system of claim 1, wherein the is further configured to request confirmation from the set of registered users responsive to matching identification information associated with the registered user with the received information.

8. The system of claim 7, wherein the first component is further configured to receive a confirmation from the set of registered users and wherein the second component is further configured to increase the first data value responsive to receiving the confirmation from the set of registered users.

9. The system of claim 1, wherein a first user of a set of registered users is associated with the received information.

10. The system of claim 1, wherein the first component is configured to receive information from at least one of a point-of-sale system and an e-commerce system.

11. A computer implemented method comprising:
    storing a list of items associated with a set of registered users user registration information uniquely identifying the set of registered users associated with the list, and an amount of available funds associated with the list;
    receiving information including a first data value from one or more devices associated with the set of registered users, wherein the first data value is a transaction amount;
    dynamically calculating an increased first data value, wherein the increased first data value is an increased transaction amount;
    matching identification information associated with the set of registered users-with the received information;
    increasing the first data value responsive to matching identification information associated with the registered user with the received information;
    increasing the amount of available funds associated with the list by the increased first data value;
    determining whether the amount of available funds has transgressed a threshold amount equal to a specified value of at least one item on the list;
    generating a notification to the set of registered users responsive to the determination that the amount of available funds transgressed the threshold;
    providing updated information including the increased data value; and
    generating a request for the at least one item responsive to determining that the amount of available funds transgressed the threshold.

12. The method of claim 11, further comprising:
    decreasing the amount of funds available by an amount equal to the specified value of the at least one item responsive to generating the request.

13. The method of claim 12, further comprising requesting confirmation from the set of registered users responsive to determining that the amount of available funds transgressed the threshold.

14. The method of claim 13, further comprising receiving a confirmation from the set of registered users and wherein the act of generating the request includes generating the request responsive to receiving the confirmation.

15. The method of claim 12, wherein the at least one item includes at least one product and wherein generating the request includes generating a shipment request to ship the at least one product to the set of registered users.

16. The method of claim 11, wherein storing a list associated with the set of registered users includes storing a priority associated with each item of the at least one item and wherein determining whether the amount of available funds has transgressed the first data value includes determining whether the amount of available funds has transgressed a threshold amount equal to a specified value of at least one item with a high priority.

17. The method of claim 11, further comprising requesting confirmation from the set of registered users responsive to matching identification information associated with the set of registered users with the received information.

18. The method of claim 17, further comprising receiving a confirmation from the set of registered users and wherein the act of increasing the amount includes increasing the first data value responsive to receiving the confirmation from the set of registered users.

19. The method of claim 11, wherein receiving information includes the act of receiving information from one of a point-of-sale system and an online payment system.

20. A non-transitory computer readable medium having stored thereon sequences of instruction that will cause at least one processor to:
- store a list of items associated with a set of registered users user registration information uniquely identifying set of registered users associated with the list, and an amount of available funds associated with the list;
- receive information including a first data value from one or more devices associated with the set of registered users, wherein the first data value is a transaction amount;
- dynamically calculate an increased data value, wherein the increased first data value is an increased transaction amount;
- match identification information associated with the set of registered users with the received information;
- increase the first data value in response to matching identification information associated with the set of registered users with the received information;
- increase the amount of available funds associated with the list by the increased first data value;
- determine whether the amount of available funds has transgressed a threshold amount equal to a specified value of at least one item on the list;
- generate a notification to the set of registered users responsive to the determination that the amount of available funds transgressed the threshold;
- provide updated information including the increased amount; and
- generate a request for the at least one item responsive to determining that the amount of available funds transgressed the threshold.

* * * * *